United States Patent [19]

Korth

[11] Patent Number: 4,526,424
[45] Date of Patent: Jul. 2, 1985

[54] SLIDE RAIL ASSEMBLY FOR A VEHICLE SEAT

[75] Inventor: Jürgen Korth, Hanover, Fed. Rep. of Germany

[73] Assignee: P.A. Rentrop Hubbert & Wagner Fahrzeugausstattungen GmbH & Co. KG, Fed. Rep. of Germany

[21] Appl. No.: 494,918

[22] Filed: May 16, 1983

[30] Foreign Application Priority Data

May 14, 1982 [DE] Fed. Rep. of Germany ....... 3218214

[51] Int. Cl.³ .............................................. A62B 35/00
[52] U.S. Cl. .................................... 297/473; 248/430
[58] Field of Search ............... 297/473, 346, 344, 216, 297/311; 248/429, 430

[56] References Cited

U.S. PATENT DOCUMENTS 4,209,159 6/1980 Becker et al. ................... 297/344 X
4,262,963 4/1981 Bauer et al. .......................... 297/473

FOREIGN PATENT DOCUMENTS 799003 3/1936 France ................................ 297/311

Primary Examiner—Kenneth Downey
Attorney, Agent, or Firm—Penrose, Lucas, Albright, Pravel, Gambrell, Hewitt and Kimball

[57] ABSTRACT

A slide rail assembly includes a U-shaped guiding rail and a U-shaped guided rail. The guided rail has turned-in portions along the longitudinal free edges of its legs, which turned-in portions engage behind adjacent legs of the U-shaped guiding rail. One leg of the guided rail together with its turned-in portion is recessed from one end of the rail to substantially the center of the rail. The other leg of the guided rail is recessed from the other end of the rail to the center.

9 Claims, 9 Drawing Figures

SLIDE RAIL ASSEMBLY FOR A VEHICLE SEAT

BACKGROUND OF THE INVENTION

1. Technical Field

The present invention relates to slide rail assemblies for mounting vehicle seats to the floor of a vehicle.

2. Prior Art

Various constructions of slide rail assemblies are known. According to one such construction, the assembly consists of two parallel and mutually spaced-apart pairs of slide rails of which each consists of a guided rail connected to the vehicle seat and, co-operating therewith and connected at both ends to the floor of the vehicle, a guiding rail of approximately the same length. The guiding rail is of substantially U-shaped cross-section. In the region of the rear end of the guided rail a mounting for the safety belt is provided. The guided rail is likewise of U-shaped cross-section, there being provided along the lower edge of each leg of the guided rail a turned-in portion which engages behind the adjacent leg of the guiding rail. By reason of the fact that the two turned-in portions on the legs of the guided rail engage behind the two legs of the guiding rail, there is said to be a "double interlocking" which substantially avoids separation of the two rails from each other under extreme loadings, e.g. in the case of collision accidents.

This known slide rail guide has the disadvantage that it is comparatively heavy, which has an unfavourable effect on the total weight of the vehicle and thus also on its efficiency.

SUMMARY OF THE INVENTION

The present invention provides a slide rail assembly for mounting a vehicle seat to a floor of a vehicle, including a longitudinally extending guiding rail having front and rear ends and means for mounting it at said ends to the floor of the vehicle, said guiding rail being of substantially U-shaped cross-section and having two longitudinally extending legs, a guided rail having front and rear ends, means for connection to the vehicle seat, and means for mounting a safety belt thereto in the region of said rear end, said guided rail being of substantially U-shaped cross-section and having two longitudinal legs with free edges, each leg having a turned-in portion adjacent said free edges, which turned-in portion engages behind an adjacent one of said longitudinally extending legs of said guiding rail, one said leg of the guided rail together with its turned-in portion being recessed adjacent one said end of the guided rail, and the other said leg of the guided rail together with its turned-in portion being recessed adjacent to the other said end of said guided rail.

DESCRIPTION OF PREFERRED EMBODIMENTS

Figure 1:
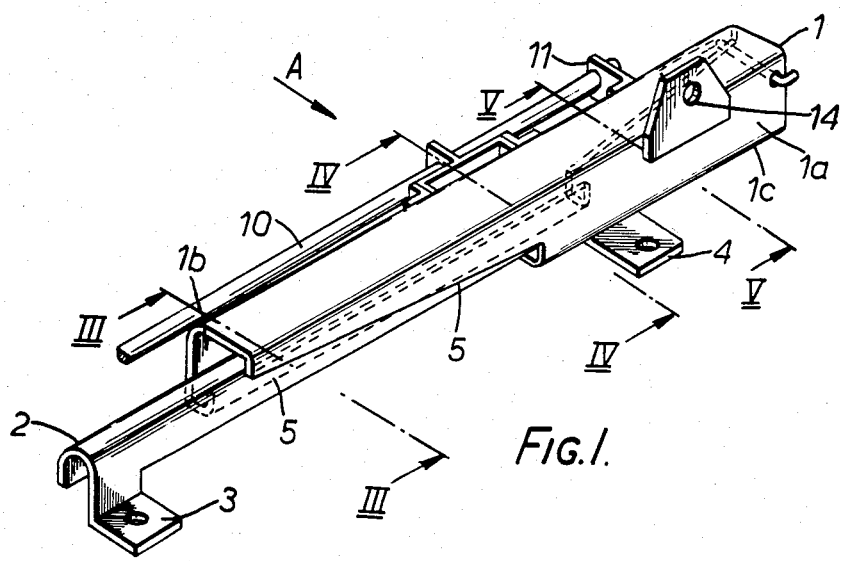
FIG. 1 is an isometric view of a pair of slide rails of the slide rail assembly according to the invention.

The drawings show a pair of slide rails of a slide rail assembly for a vehicle seat which consists of two spaced-apart and parallel pairs of slide rails. Each pair of slide rails consists of a guided rail 1 and a guiding rail 2. The guided rail 1 is adapted to be mounted on the vehicle seat which, for reasons of clarity, is not shown in greater detail. At its front and rear ends, the guiding rail 2 is attached to the floor of the vehicle, which is likewise not shown in greater detail. The fixing points are indicated by reference numerals 3 and 4 in FIG. 1 of the drawings. The two rails 1 and 2 are of approximately the same length and so co-operate with each other so that in a released position the guided rail 1 is free to slide along the guiding rail 2.

As FIGS. 4 and 7 to 9 show, the guided rail 1 is of U-shaped cross-section with legs, 1a,1b of different lengths, the opening of the U pointing downwards. The two legs 1a,1b have turned-in portions 1c,1d respectively along their longitudinal edges.

The guiding rail 2 is of substantially U-shaped cross-section, the opening of the U pointing downwards. The two legs are identified by reference numerals 2a,2b.

FIGS. 4 and 7 to 9 show the leg 2a of the guiding rail 2 engages into the turned-in portion 1c, while the leg 2b engages into the turned-in portion 1d of the guided rail 1.

The mounting 14 (FIGS. 1 and 2) for the safety belt is mounted in the region of the rear end of the guided rail 1.

Figure 2:
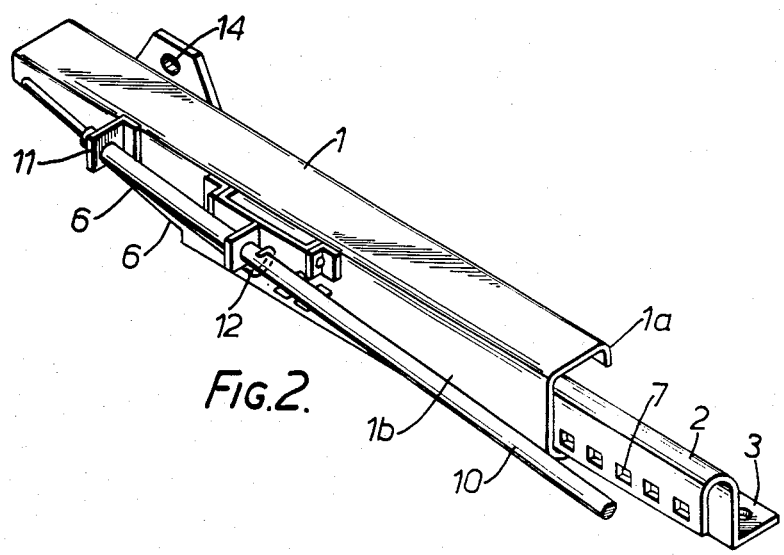
FIG. 2 is a view in the direction of the arrow A in FIG. 1.

As FIGS. 1 and 2 show, one of the two legs 1a,1b, namely the leg 1a together with its turned-in portion 1c is recessed in the region of the front end of the guided rail 1. This recess 5 extends in the longitudinal direction substantially as far as the centre of the guided rail 1.

At the other end of the two legs 1a,1b, the leg 1b together with its turned-in portion 1d is recessed in the region of the rear end of the guided rail 1. This recess 6 at the rear end of the guided rail 1 commences approximately in the centre.

Figure 3:
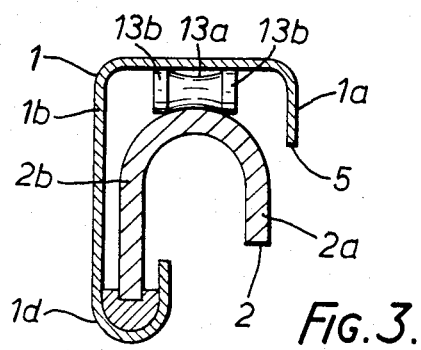
FIG. 3 is a cross-section taken on the line III—III in FIG. 1.
Figure 4:
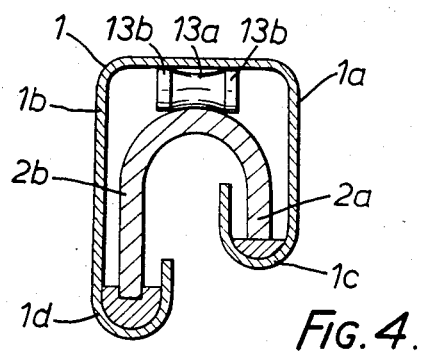
FIG. 4 is a cross-section taken on the line IV—IV in FIG. 1.
Figure 5:
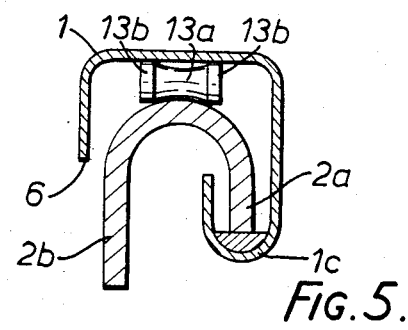
FIG. 5 is a cross-section taken on the line V—V in FIG. 1.
Figure 6:
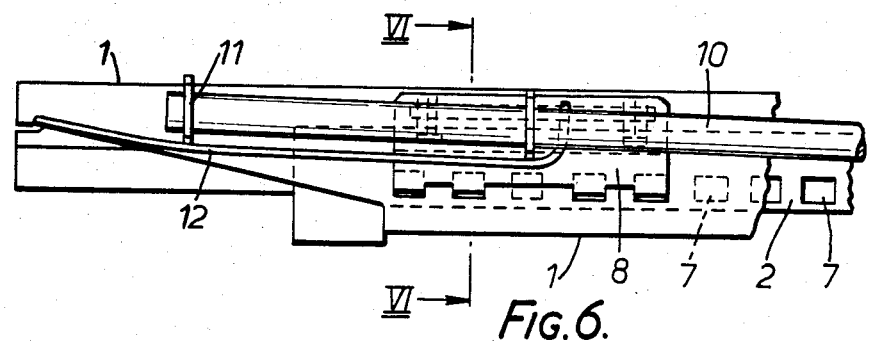
FIG. 6 is a partial plan view on an enlarged scale of a pair of slide rails of the slide rail assembly according to the invention.

The purpose of these two recesses 5 and 6 can best be seen from FIGS. 3 to 5. When the guided rail 1 is in such a position that the mounting 14 for the safety belt is in a region of the front end of the guiding rail 2 (FIG. 3), then there is only a single interlock situation in that only the leg 2a of the guided rail 2 is engaging the turned-on portion 1c of the guiding rail 1. Since in this position the forces tranmitted by the safety belt via the mounting 14 to the guided rail are relatively small, then a double interlock may be dispensed with.

The same considerations apply logically to a position in which the mounting 14 for the safety belt is disposed in the rear zone of the guide rail 2. This condition is illustrated in FIG. 5 of the drawings in which only the leg 2b of the guiding rail 2 engages the turned-in portion 1d of the guided rail 1, in other words where only a single interlock is involved.

The double interlocking action on the other hand is shown in FIG. 4 of the drawings. In the position shown there, the mounting 14 for the safety belt is in the middle zone of the guiding rail 2. There, too, the highest forces arise and, in fact in the event of impact accidents, they are transmitted from the safety belt via the mounting 14 to the slide rail assembly. In this position, therefore, a double interlock is indispensable, the leg 2a of the guiding rail 2 engaging the turned-in portion 1d of the guided rail 1.

As the drawings show, there are in the leg 2b of the guiding rail 2 serially disposed recesses 7 for engagement of a locking member 8 of a locking device which determines the location of the two rails 1, 2 of one pair of rails with respect to one another.

Figure 7:
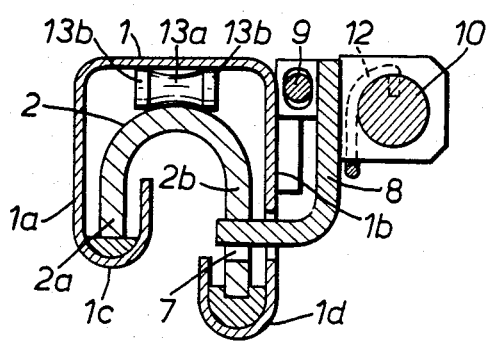
FIG. 7 shows a cross-section taken on the line VI—VI in FIG. 6.
Figure 8:
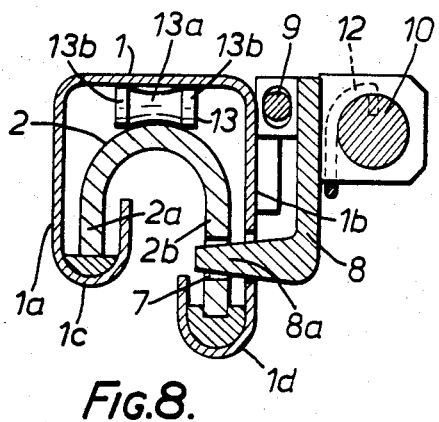
FIGS. 8 and 9 are corresponding views of somewhat modified embodiments of the locking member of the locking device for the slide rail assembly.
Figure 9:
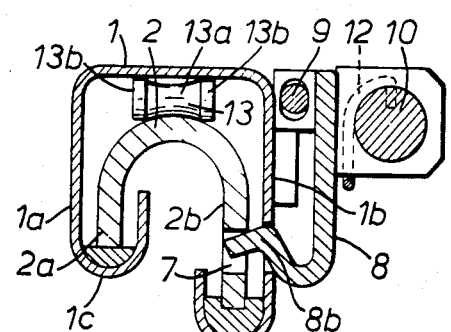

The locking member 8 is constructed as a pivotable locking member, the pivoting axis being indicated by the reference number 9 in FIGS. 7 to 9. The locking member 8 can be actuated via a single-armed lever and is biassed by a torsion spring 12, one end of which is fixed on the lever 10 while its other end is fixed on the guided rail 1. The torsion spring 12 biases the locking member 8 into the locking position when the single-armed lever 10 is released.

If the single-armed lever 10 has one end raised against the force of the torsion spring 12, then the locking member 8 is moved into the released position, which means it leaves the corresponding recess 7 in the guiding rail 2.

As FIGS. 7 to 9 show, the guided rail 1 is supported on the guiding rail 2 through serially disposed sliding members 13. Each sliding member 13 or rolling member has a hyperboloid-shaped part 13a adjacent to which there is on each side a cylindrical part 13b. By reason of the fact that the hyperboloid-shaped part 13 bears against the curvature of the guiding rail 2, perfect guidance is assured at extremely low friction. It is therefore possible to dispense with special guide grooves and the like.

The end of the locking member 8 is so constructed that in the locking position the guiding rail 2 is pressed against the sliding members 13 to ensure a satisfactory locking effect. This object can be achieved in various ways. For example, the end of the locking member 8 may take the form of a wedge 8a, as is indicated in FIG. 8 of the drawings. It is, however, also possible to provide the end of the locking member 8 with an offset 8b (FIG. 9) which likewise provides the necessary clamping or locking effect and thus prevents rattling.

It will be appreciated that the above described slide rail assembly, by reason of the recesses 5, 6, is relatively light in weight, and yet avoids any risk of the rails becoming separated under extreme loading transmitted to the guiding rail via the safety belt mounting 14.

What we claim is:

1. A slide rail assembly for mounting a vehicle seat to a floor of a vehicle, including
    a longitudinally extending guiding rail having front and rear ends and means for mounting it at said ends to the floor of the vehicle, said guiding rail being of substantially U-shaped cross-section and having two longitudinally extending legs,
    a guided rail having front and rear ends, means for connection to the vehicle seat, and means for mounting a safety belt thereto in the region of said rear end, said guided rail being of substantially U-shaped cross-section and having two longitudinal legs with free edges, each leg having a turned-in portion adjacent said free edges, which turned-in portion engages behind an adjacent one of said longitudinally extending legs of said guiding rail, one of said leg of the guided rail together with its turned-in portion being recessed adjacent one said end only of the guided rail, and the other said leg of the guided rail together with its turned-in portion being recessed adjacent to the other said end only of said guided rail.

2. A slide rail assembly according to claim 1, in which said one leg of the guided rail is recessed substantially as far as the centre of the guided rail, and said other leg of the guided rail is recessed from a point substantially in the centre of the guided rail.

3. A slide rail assembly according to claim 1, in which one said leg of the guiding rail has serially disposed recesses defined therein, the assembly further including a locking device having a locking member engageable in a selected one of said recesses in the guiding rail to lock the guided and guiding rails in a selected position relative to one another.

4. A slide rail assembly according to claim 3, in which said locking member is pivotable, said assembly further including a single armed lever for pivoting said locking member.

5. A slide rail assembly according to claim 4, further including a torsion spring which biases said single armed lever into a position in which the locking member is in a locking position in a selected one of said recesses in the guiding rail.

6. A slide rail assembly according to claim 1, further including a plurality of serially disposed sliding members positioned between the guiding and guided rails.

7. A slide rail assembly according to claim 6, in which each said sliding member has a hyperboloid-shaped part having cylindrical parts on each side thereof.

8. A slide rail assembly according to claim 6, in which one said leg of the guiding rail has serially disposed recesses defined therein, the assembly further including a locking device having a locking member engageable in a selected one of said recesses in the guiding rail to lock the guided and guiding rails in a selected position relative to one another.

9. A slide rail assembly according to claim 8, in which the end of the locking member is so constructed that when in the locking position the guiding rail is pressed against said sliding members.

* * * * *